(12) United States Patent
Fleck

(10) Patent No.: US 6,358,301 B1
(45) Date of Patent: Mar. 19, 2002

(54) PROCESS FOR PREPARING AN ADSORBENT WHICH IS LOADED WITH AN OIL

(75) Inventor: Ute Fleck, Basel (CH)

(73) Assignee: Roche Vitamins Inc., Parsippany, NJ (US)

(*) Notice: Subject to any disclaimer, the term of this patent is extended or adjusted under 35 U.S.C. 154(b) by 0 days.

(21) Appl. No.: 09/489,821

(22) Filed: Jan. 24, 2000

(30) Foreign Application Priority Data

Jan. 25, 1999 (EP) .......................................... 99101305

(51) Int. Cl.[7] .............................................. B01D 50/00
(52) U.S. Cl. ................................................ 95/92; 95/94
(58) Field of Search ................................ 95/90, 92, 94, 95/141, 143, 245, 263; 96/202, 134, 135, 136

(56) References Cited

U.S. PATENT DOCUMENTS

| | | | |
|---|---|---|---|
| 4,263,253 A | * 4/1981 | Pilz et al. ........................ 422/1 |
| 4,492,592 A | * 1/1985 | Diaz et al. ....................... 62/18 |
| 4,575,387 A | * 3/1986 | Larue et al. ..................... 62/17 |
| 5,079,025 A | * 1/1992 | Zobel et al. ................... 426/590 |
| 5,470,377 A | * 11/1995 | Whitlock ........................ 95/90 |
| 5,538,540 A | * 7/1996 | Whitlock ....................... 96/111 |
| 5,599,381 A | * 2/1997 | Whitlock ........................ 95/90 |
| 5,676,737 A | 10/1997 | Whitlock | |
| 5,858,068 A | * 1/1999 | Lansbarkis et al. ........... 95/116 |
| 5,968,232 A | * 10/1999 | Whitlock ....................... 95/90 |

FOREIGN PATENT DOCUMENTS

FR 2 602 772 7/1986

OTHER PUBLICATIONS

Derwent English language abstract of FR 2 602 772 1988.
Brunner, G., "Properties of Supercritical and Near–Critical Gases and of Mixtures with Sub–and Supercritical Components," in *Topics in Physical Chemistry*. Steinkopff, Darmstadt, Springer (New York), vol. 4, pp. 3–57 (1994).

* cited by examiner

Primary Examiner—Duane S. Smith
(74) Attorney, Agent, or Firm—Bryant Cave LLP

(57) ABSTRACT

The invention relates to a process for preparing a highly loaded adsorbent by extracting an oil from an oil crude product using supercritical fluid extraction to obtain a loaded supercritical fluid (SCF). The loaded SCF is expanded, followed by heating to obtain a liquid phase and an in-loading reduced SCF phase. Optionally, the pressure is decreased and/or the temperature of the SCF is raised to conditions of adsorption. The SCF is introduced into a fixed bed adsorber to obtain an adsorbent loaded with the purified oil and pure SCF. The liquid phase is fed as a reflux to the extraction device. The pure SCF is compressed and tempered to extraction conditions. The pure SCF is recycled to an extraction device. Also provided is a process for purifying an oil from an oil crude product by desorbing the adsorbed oil.

34 Claims, 3 Drawing Sheets

PROCESS FOR PREPARING AN ADSORBENT WHICH IS LOADED WITH AN OIL

The present invention relates to a process for purifying an oil and to a process for preparing an adsorbent which is loaded with an oil.

SUMMARY OF THE INVENTION

One embodiment of the invention relates to a process for preparing an adsorbent which is loaded with an oil by combining supercritical fluid extraction (SFE) with adsorption.

Another embodiment of the invention relates to a process for purifying an oil by combining SFE, adsorption and desorption.

Another embodiment of the invention relates to a process for purifying an oil by SFE, whereby in a first step the oil is extracted together with high volatile components while the low volatile components are separated in a raffinate stream. In a second step the high volatile components are separated.

BACKGROUND OF THE INVENTION

The supercritical fluid extraction (SFE) is a known process which is e.g. described by G. Brunner: Gas Extraction in "Topics in Physical Chemistry", Steinkopff, Springer, Darmstadt and New York 1994.

The combination of a continuous fluid extraction with adsorption is known to purify gases. U.S. Pat. No. 5,676,737 describes e.g. a separation of solutes dissolved in a gaseous phase by passing the gaseous solvent containing the solute through a sorbent bed to produce a purified gaseous solvent.

DETAILED DESCRIPTION OF THE INVENTION

Figure 1:
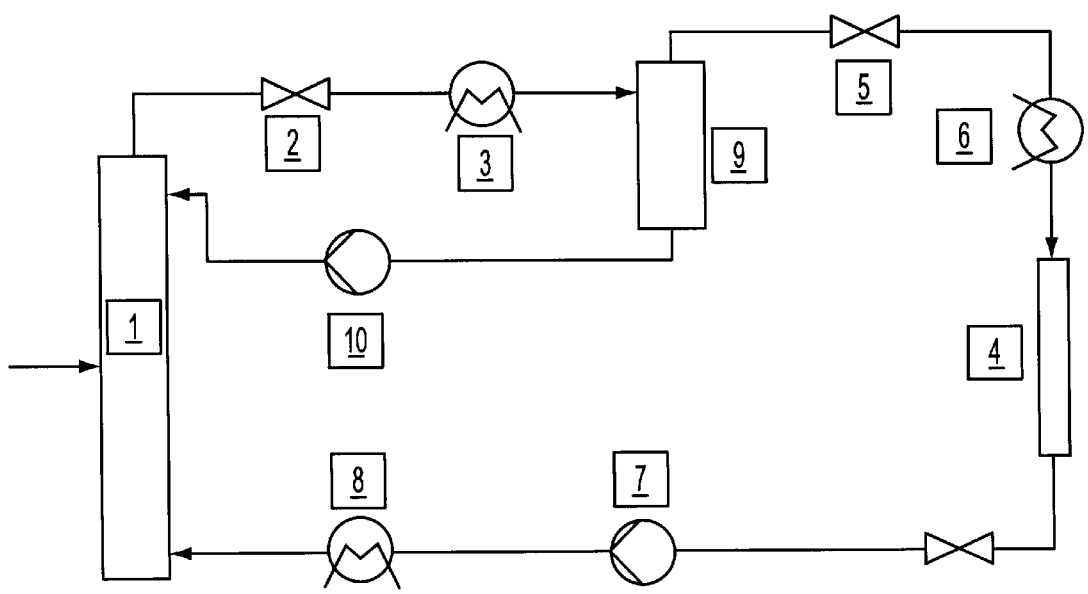
FIG. 1 Schematic of a device for preparing a highly loaded adsorbent.

It has now been found that a combination of supercritical fluid extraction, separation of solute and solvent and adsorption as described below provides a continuous process to effectively prepare a highly loaded adsorbent.

Accordingly, the invention relates in one embodiment to a process for preparing a highly loaded adsorbent, which process comprises the steps of a) extracting an oil from an oil crude product by means of supercritical fluid extraction thus, obtaining a loaded supercritical fluid (SCF);

b) expanding the loaded SCF of step a) followed by heating to obtain a liquid phase and an in-loading reduced SCF phase;

c) optionally decreasing the pressure and/or raising the temperature of the SCF phase of step b) to conditions of adsorption;

d) introducing the SCF of step b) or step c) into a fixed bed adsorber to obtain an adsorbent loaded with the purified oil and pure SCF;

e) feeding the liquid phase of step b) as a reflux to the extraction device of step a);

f) compressing and tempering the pure SCF of step d) to extraction conditions; and g) recycling the pure SCF to the extraction device of step a).

The advantage of the above described process is to be seen in avoiding mechanical stress while loading the adsorbent and in reducing the energy cost in comparison to the SFE process with pressure reduction as separation principle for solute and solvent or in comparison to conventional vacuum distillation.

As used herein the term "oil" refers to a lipophilic active ingredient such as, e.g., vitamin A, D, E, or K, carotenoids or PUFAs (polyunsaturated fatty acids). Preferred is vitamin E, including synthetically manufactured dl-alpha tocopherols and the corresponding esters, such as, e.g., dl-alpha tocopherolacetat, or a mixture of natural tocopherols and the corresponding esters.

As used herein the term "supercritical fluid" refers to carbon dioxide, methane, ethane, propane, n-butane, acetone, and mixtures thereof. Preferred is carbon dioxide.

As used herein the term "adsorbent" refers, e.g., to zeolites, activated carbon, molecular sieves, silica, activated alumina, and the like. Preferred is silica. A suitable silica is, e.g., ZEOFREE 5170, available from J. M. Huber Corp., Locust, N.J. USA.

As used herein the term "highly loaded adsorbent" refers to a loading of the adsorbent with the oil of at least 30 wt %, preferably at least 50 wt %.

As used herein the term "conditions of adsorption" does not refer to fixed conditions. The conditions depend on the kind of oil and the desired loading of the adsorbent.

As used herein the term "extraction conditions" does not refer to fixed conditions. The conditions of extraction depend on the kind of oil crude product and the SCF used. Pressure and temperature must have a value above the critical temperature and pressure, at least in the near critical region.

As used herein the term "in-loading reduced SCF phase" refers to a SCF phase which contains less solute than the loaded SCF phase obtained in step a).

Thus, a preferred embodiment of the invention relates to a process for preparing a silica loaded with at least 50 wt % vitamin E. The process starts extracting vitamin E from a vitamin E crude product in an extraction device to obtain a technical grade vitamin E containing about 92 wt % of pure vitamin E.

The purification of crude vitamin E by selective extraction using supercritical carbon dioxide (step a) is known in the art and described in the French patent publication FR 2 602 772. As described therein, a good separation is effected at a pressure in the range of 80 to 250 bar and at a temperature in the range of 35 to 55° C. Thus, a loaded supercritical carbon dioxide is obtained, loaded with vitamin E containing about 60 wt % to about 98 wt % of pure vitamin E.

According to the present invention, a good separation can also be effected at higher temperatures and higher pressures as described in FR 2 602 772. Temperatures up to 100° C. and pressures up to 310 bar are suitable. Thus, a good separation is effected at a pressure in the range of about 80 to about 310 bar and at a temperature in the range of about 35° C. to about 100° C. Preferred is a temperature of about 60° C. and a pressure of about 140 to about 170 bar.

The process for preparing a highly loaded adsorbent will now be set forth in greater detail with reference to FIG. 1, showing schematically a device for preparing a highly loaded adsorbent.

The process starts by feeding the supercritical fluid under pressure into the extraction device (1). The oil crude product is fed into the extraction device (1) where the oil is dissolved and extracted, thereby obtaining supercritical fluid (SCF) loaded with oil (step a). The oil crude product may be a synthetic crude product or may be obtained from natural sources.

The extraction can also be carried out batchwise in an autoclave.

The loaded SCF is then expanded by passing through pressure reduction valve (2) to a pressure where the solubility (solubilisation capacity) of the SCF is reduced to obtain an in-loading reduced SCF and a liquid phase (step b). The pressure reduction depends on the applied SCF and on the extraction conditions. The appropriate reduction of the pressure can be determined by phase equilibria measurements. Because of the pressure drop, the temperature is reduced. Thus, the in-loading reduced SCF and the liquid phase are passed to a heater (3).

In the separator (9), the liquid phase is separated from the in-loading reduced SCF. From the separator (9), the liquid phase is fed via pump (10) as reflux to the extraction device (1) (step e).

The "conditions of adsorption" depend on the kind of oil and the desired loading of the adsorbent and are not fixed. The in-loading reduced SCF is fed to a fixed bed adsorber (4) either directly or after decreasing the pressure by passing through reduction valve (5) (step d).

The reduced pressure in step d) causes a reduction of the temperature, too, thus, another heat exchanger (6) is necessary.

The loaded SCF is expanded to a pressure preferably in the range of about 30 to about 300 bar, and heated to about 40 to 120° C. in order to reduce the loading of the SCF so that enough liquid phase for the reflux is provided and overloading or insufficient loading of the adsorbent is avoided. Suitably, the gas flow through the fixed bed adsorber is about 0.1–5 $g_{solvent}/(min \cdot g_{adsorbent})$.

In the case of extracting vitamin E with carbon dioxide the loaded supercritical carbon dioxide is expanded to a pressure preferably in the range of about 120 to about 150 bar, and heated to about 80° C., thereby reducing the loading of the supercritical carbon dioxide to about 1 wt %. The gas flow through the fixed bed adsorber is preferably about 0.5 to about 2.5, particularly 1.3 $g_{solvent}/(min \cdot g_{adsorbent})$. The diluted components are adsorbed while passing through the fixed bed adsorber. An adsorbent is obtained that is loaded with the solute and pure SCF. The SCF is recycled via compressor (7) and cooler (8) to the extraction device (steps f and g). When using gas mixtures for the extraction the content of gas mixture is analyzed and optionally regulated by feeding pure gas before the SCF is recycled.

Figure 2:
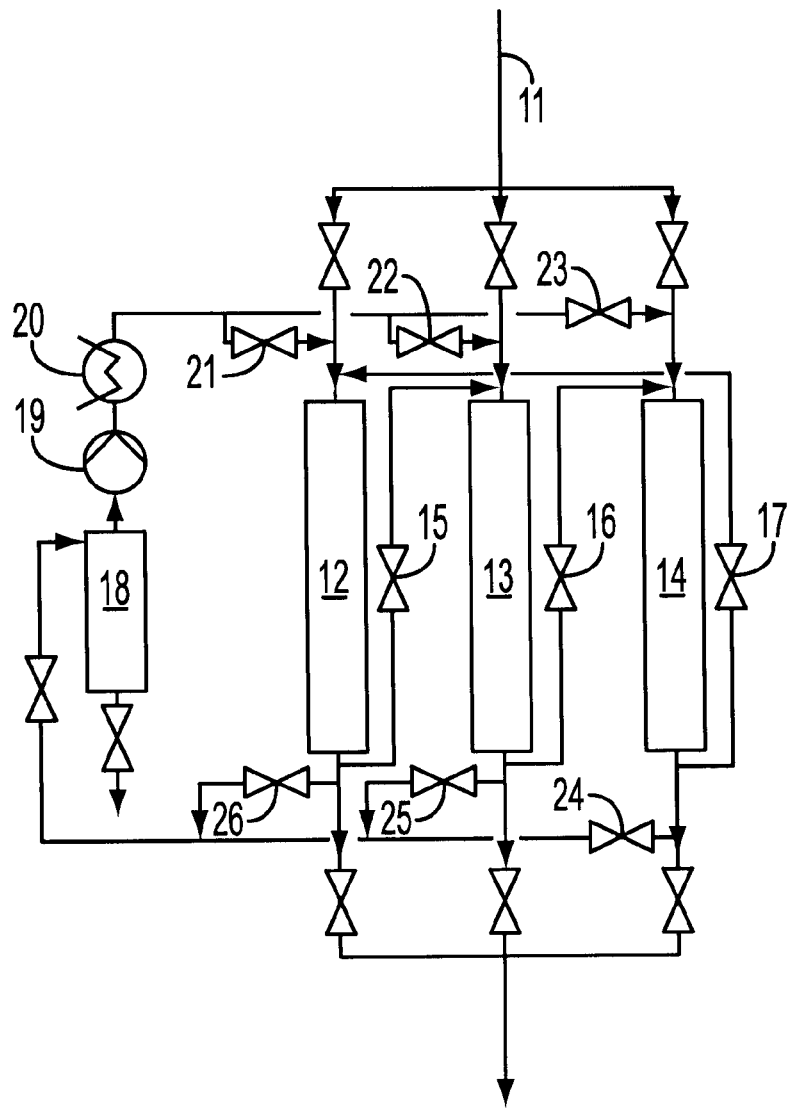
FIG. 2 Schematic of a device for preparing an adsorbent that is loaded with an oil followed by desorbing the oil.

FIG. 2 is a schematic view of a device for preparing an adsorbent that is loaded with an oil followed by desorbing the oil according to an illustrative embodiment of the present invention.

The extraction, adsorbing, and desorbing device shown in FIG. 2 includes a SCF supply section (11), adsorbing/desorbing devices (12), (13), (14), and a separator (18).

The SCF loaded with the extracted oil is fed to the fixed bed adsorber (12). When the loading has nearly reached the desired value, valve (15) is opened to start the loading of fixed bed adsorber (13). When fixed bed adsorber (12) is completely loaded, the SCF flow to adsorber (12) is closed and adsorber (13) is solely loaded.

When the loading of adsorber (13) has nearly reached the desired value, valve (16) is opened to start the loading of fixed bed adsorber (14). When fixed bed adsorber (13) is completely loaded, the SCF flow to adsorber (13) is closed and adsorber (14) is solely loaded.

The desorbing solvent is adapted to the conditions of desorption by passing through hydraulic valve (19) and heater (20). Over valve (21) the desorbing solvent is passed to the fixed bed adsorber (12). By passing through the fixed bed adsorber, the solvent is loaded with the former adsorbed oil. The loaded solvent is passed through valve (26) in order to decrease the pressure and thus solubility. Afterwards the loaded solvent is fed to the separator (18) where the adsorbed oil is obtained as a liquid phase. Moreover, the unloaded solvent is recycled and brought to desorption conditions to be provided for the next desorption step, which is effected in adsorber (13).

When the loading of adsorber (14) has nearly reached the desired value, valve (17) is opened to start loading again fixed bed adsorber (12). When fixed bed adsorber (14) is completely loaded, the SCF flow to adsorber (14) is closed and adsorber (12) is solely loaded again.

When adsorber (13) is completely loaded, the desorbing solvent is passed via valve (22) to the fixed bed adsorber (13). The desorbed oil is fed over valve (25) to the separator (18).

When adsorber (14) is completely loaded, the desorbing solvent is passed via valve (23) to the fixed bed adsorber (14). The desorbed oil is fed over valve (24) to the separator (18).

A purified oil is obtained from an oil crude product by the whole process of extraction, adsorption, and desorption.

Thus, the present invention further comprises a process for purifying an oil by:

a) extracting an oil from an oil crude product by means of supercritical fluid extraction, thereby obtaining a loaded supercritical fluid (SCF);

b) expanding the loaded SCF of step a) followed by heating to obtain a liquid phase and an in-loading reduced SCF phase;

c) optionally decreasing the pressure and/or raising the temperature of the in-loading reduced SCF phase of step b) to conditions of adsorption;

d) introducing the SCF of step b) or step c) into a fixed bed adsorber to obtain an adsorbent loaded with the purified oil and pure SCF;

e) feeding the liquid phase of step b) as a reflux to the extraction device of step a);

f) compressing and tempering the pure SCF of step d) to extraction conditions;

g) recycling the pure SCF to the extraction device of step a); and h) desorbing the adsorbed oil by passing a desorbing solvent through the fixed bed adsorber, Suitable "desorbing solvents" include, e.g., carbon dioxide, methane, ethane, propane, n-butane, acetone, ethanol, ethylacetate and mixtures thereof.

The "conditions of desorption" are about 30 to about 300 bar and about 40 to 150° C.

Vitamin E is preferably desorbed by propane at about 60 bar and about 70° C.

The desorbed oil can be further purified in a second circuit, e.g., the adsorbed technical grade vitamin E containing about 92 wt % pure vitamin E can thus be purified to a pharma grade vitamin E containing at least 97 wt % pure vitamin E. It is possible to purify the desorbed oil up to contents of 99.9 wt %.

To further purify the desorbed technical grade vitamin E, the desorbate is fed to an extraction device. The extraction principle remains the same as before (step a). Pure SCF is provided at the bottom of the extraction device (1). The loaded SCF is released (step b), conditions are optionally changed for adsorption (step c) and the in-loading reduced SCF is led to a fixed bed adsorber. A reflux, which is provided by step b), is fed to the extraction device (step e) and the pure SCF is brought up to extraction conditions (step f).

The process described in FR 2 602 772 starts by extracting the high volatile components of the tocopherol crude product. The raffinate contains a mixture of low volatile components and tocopherol.

In contrast to FR 2 602 772, it has now been found that a first separation of the low volatile components in a raffinate stream increases the separation quality and the yield of the process. After the separation of the low volatile components, separation of the high volatile components is much easier and yield is further increased. Yields up to 99.9% may be obtained.

Thus, another embodiment of the invention is a process for purifying an oil, optionally combined with a process for preparing a highly loaded adsorbent by A) extracting a fraction containing oil together with high volatile components from a crude synthetic or natural oil mixture by means of supercritical fluid extraction (SFE), thereby obtaining a loaded supercritical fluid (SCF) and a raffinate containing the low volatile components of the crude product;

B) expanding the loaded SCF of step A) followed by heating to obtain a liquid phase, which contains the oil and high volatile components and an unloaded gas phase (step B-1) or to obtain a liquid phase and an in-loading reduced SCF (step B-2);

C) optionally decreasing the pressure and/or raising the temperature of the in-loading reduced SCF phase of step B-2) to conditions of adsorption;

D) optionally introducing the in-loading reduced SCF of step B-2) or of step C) into a fixed bed adsorber to obtain an unloaded gas phase and an adsorbent loaded with oil;

E) collecting the unloaded gas phase of step B-1) or of step D) in a vessel and controlling the content of the gas components;

F) when using gas mixtures, optionally feeding pure gas into the vessel of step E) to ensure the same gas composition over the entire process time;

G) feeding part of the liquid phase of step B-1) or all of the liquid phase of step B-2) at the same temperature and pressure of the column as a reflux to the extraction device of step A);

H) pressurizing the gas phase of step E) or of step F) followed by cooling to separation conditions;

I) recycling the SCF of step H to the extraction device of step A);

J) optionally feeding the liquid phase of step B-1) to a second extraction device;

K) extracting a fraction of high volatile components from the extract of step B-1) by means of SFE thus obtaining a loaded SCF and the pure oil as raffinate;

L) treating the reflux and the SCF as described in the steps B-1) and -I);

M) collecting the oil at the bottom of the column as a raffinate.

The fat soluble oil is preferably vitamin E as defined above.

The above described process for purifying an oil, optionally combined with a process for preparing a highly loaded adsorbent, is preferably a process for purifying a vitamin E crude product. The preferred process includes the following:

an extraction process for preparing technical grade vitamin E from a vitamin E crude product by separating the low volatile components (steps A, B-1; E, F; G, H and I); and an extraction process for preparing pharma grade vitamin E from a technical grade vitamin E by separating the high volatile components (steps K–M).

Optionally the process may be combined with an adsorption process to prepare an absorbent loaded with technical grade vitamin E (steps A, B-2, C and D).

The process for purifying vitamin E starts by extracting a mixture of high volatile components and vitamin E in an extraction device to obtain a technical grade vitamin containing about 92 wt % of pure vitamin. This technical grade vitamin E can be fed to a second extracting device (step J) or the technical grade vitamin E may be introduced to a fixed bed adsorber to obtain a highly loaded adsorbent (steps C–D). In a second purification process (steps K, L and M), a pharma grade vitamin E containing up to 99.9 wt % of vitamin E may be obtained.

Supercritical solvents used to extract a mixture of vitamin E and high volatile components from the crude product (steps A, B-1; E, F; G, H and I) are the solvents used in the process for preparing a highly loaded adsorbent and listed above. A preferred supercritical solvent is a mixture of carbon dioxide and propane. The content of propane can vary in a broad range from 1–99.9 vol %, preferred is a propane content of about 10 vol % to about 30 vol %.

Supercritical solvents used to extract high volatile components from a mixture of vitamin E and high volatile components (steps K–M) are the solvents used in the process for preparing a highly loaded adsorbent and listed above. Preferred is carbon dioxide.

The above described purification process uses, in contrast to FR 2 602 722, a constant reflux with same temperature and pressure as in the separation column. Thus, the separation process is isothermal. By using such a reflux, the process control is improved and the purity of the product and the yield can easily be increased.

Figure 3:
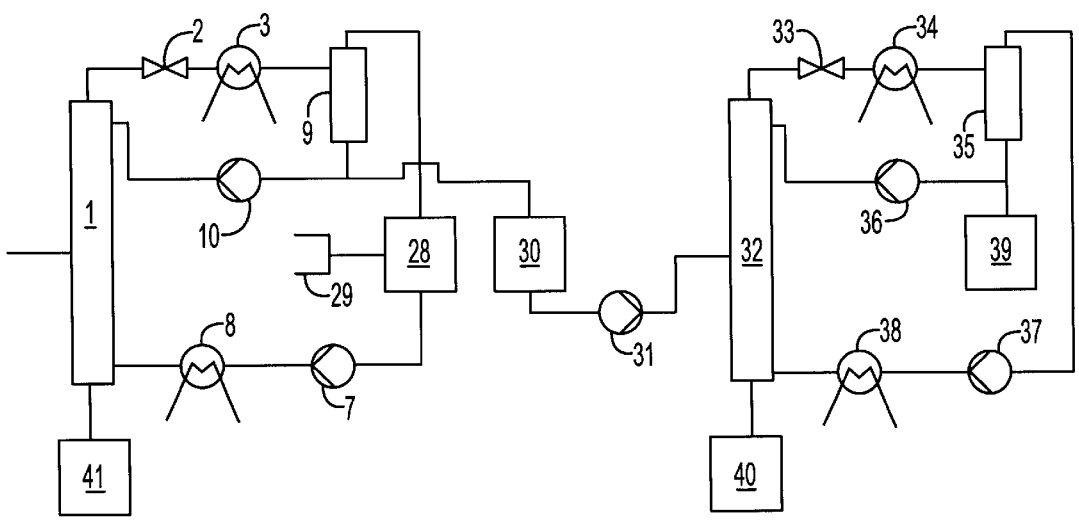
FIG. 3 Schematic of a device for purifying an oil.

FIG. 3 shows a schematic of a device suitable for a process for purifying an oil whereby the high volatile components and the oil are extracted and the low volatile components are separated in a raffinate stream followed by the separation of high volatile components.

The device of FIG. 3 contains the device elements of FIG. 1 (1, 2, 3, 7, 8, 9, 10).

The process starts by feeding the supercritical fluid under pressure into the extraction device (1). The oil crude product is fed into the extraction device (1) where the oil is dissolved and extracted obtaining SCF loaded with oil (step A).

The loaded SCF is then expanded by passing through pressure reduction valve (2) to a pressure where the solubility of the SCF is reduced to obtain an unloaded SCF and a liquid phase (step B-1) or to obtain a liquid phase and an in-loading reduced SCF (step B-2). The pressure reduction depends on the applied SCF and on the extraction conditions. Because of the pressure drop, temperature is reduced. Thus, the unloaded SCF and the liquid phase (step B-1) or the liquid phase and the in-loading reduced SCF (step B-2) are passed to a heater (3).

In the separator (9), the liquid phase is separated from the unloaded SCF or from the in-loading reduced SCF. The in-loading reduced SCF may be fed to a fixed bed adsorber as shown in FIG. 1 (steps C and D). After passing the fixed bed adsorber an unloaded gas phase is obtained, which is not shown in FIG. 3.

The unloaded SCF of step B-1 is collected in vessel (28) (step E) and recycled via compressor (7) and cooler (8) to the extraction device (1) (step I). If necessary, pure gas from vessel (29) is fed into vessel (28). The raffinate stream of the first extraction step containing the low volatile components is collected in vessel (41).

From the separator (9) the liquid phase is fed via pump (10) as reflux to the extraction device (1) (step G). Concerning step B-1, only a part of the liquid phase containing the oil and high volatile components is fed back to the extraction device. The other part is collected in vessel (30) and is fed via pump (31) to a second extracting device (32). Compared to extraction device (1), the extraction conditions in device (32) change in terms of lower solvent density and higher solvent flow. The loaded SCF (loaded with high volatile components) is expanded (33), heated (34) and fed to a separator (35). After expansion, a liquid phase is obtained containing the high volatile components, which are collected in vessel (39). The unloaded SCF is recycled via compressor (37) and cooler (38) to the extraction device (32). Vessel (40) contains the pure oil as raffinate.

In the process of FIG. 3, preferably Vitamin E is purified, including synthetically manufactured dl-alpha tocopherols and the corresponding esters, such as, e.g., dl-alpha tocopherolacetat, or a mixture of natural tocopherols and the corresponding esters.

In the case of vitamin E, step A is carried out at a temperature of about 40° C. to about 100° C., preferably of about 40° C. to about 60° C., and a pressure of about 60 bar to about 310 bar, preferably of about 120 bar to about 170 bar.

In step B-1, the pressure is reduced to separation conditions of about 60 bar to about 150 bar, preferably of about 60 bar to about 70 bar. The subsequent heating step is carried out at about 40° C. to about 80° C., preferably of about 50° C. to about 60° C.

In step B-1, the pressure is reduced as described above for the process shown in FIG. 1. The loaded SCF is expanded to a pressure in the range of about 120 bar to about 150 bar, and heated to about 80° C.

The temperature and pressure of the reflux stream corresponds to the temperature and pressure of step A. Thus, the reflux stream has a temperature of of about 40° C. to about 100° C., preferably of about 40° C. to about 60° C., and a pressure of about 60 bar to about 240 bar, preferably of about 120 bar to about 160 bar.

The following Examples illustrate the invention but do not limit its scope in any manner.

EXAMPLE 1

Preparation of a loaded silica, loaded with 50 wt.-% of technical grade vitamin E containing about 92 wt % of pure vitamin E.

The extraction was done in an autoclave. The conditions in the autoclave were: 60° C. and 160 bar. The SCF was $CO_2$. These conditions simulate the conditions needed for a reduced solubility of the SCF in the separator (9). In the autoclave, a phase equilibrium was reached. The gas phase was led through a hydraulic valve to the fixed bed adsorber (4). The hydraulic valve was controlled by pressure measurement. Pressure was reduced to adsorption conditions of 150 bar. The fixed bed adsorber was tempered at 80° C. When the desired pressure in the fixed bed adsorber was reached, flow control started. The flow of the gas phase was controlled by massflow measurement, which is based on the Coriolis force. The gas flow was about 1.3 $g_{solvent}/(min \cdot g_{adsorbent})$. Adsorption was stopped, when a loading of about 50 wt. % was reached. A solubility of the gas phase in the autoclave of 1 wt. % means a total gas flow of 3000 g or 150 minutes of adsorption time, respectively. The amount of adsorbent was about 30 g. Adsorption was stopped by closing a manually operated valve, which is placed between autoclave and fixed bed adsorber.

EXAMPLE 2

Desorption of the adsorbed vitamin E of Example 1.

Desorption follows directly after adsorption. In case of desorption, pure solvent is necessary to desorb the adsorbed oil. Thus, the manually operated valve between autoclave and fixed bed adsorber remained closed and another manually operated valve was opened to provide pure solvent for desorption. The principle of the hydraulic valves to regulate pressure and massflow remains the same as in case of adsorption (Example 1). For desorption, pressure was reduced to 60 bar and the fixed bed adsorber was tempered at 70° C. The solvent was propane. Flow of propane was about 0.17 $g_{solvent}/(min^* g_{adsorbent})$. First, the unpressurized fixed bed adsorber was done under pressure. Second, the hydraulic valve to regulate the massflow was opened. After the fixed bed adsorber, propane was released and the desorbed oil was collected in a let-down vessel. Finally, desorption was stopped after a total flow of 350 g propane. Afterwards, pressure of the fixed bed adsorber was released and adsorption can start again.

EXAMPLE 3

Preparation of a loaded silica while purifying the desorbed technical grade vitamin E of Example 2 up to pharma grade vitamin E containing about 97 wt % pure vitamin E.

The extraction was done in an autoclave. The conditions in the autoclave were: 60° C. and 150 bar. The SCF was $CO_2$, which was loaded after the extraction step by technical grade vitamin E and impurities, which are low volatile compared to vitamin E. In the autoclave, a phase equilibrium was reached. The gas phase was led through a hydraulic valve to the fixed bed adsorber (4). The hydraulic valve was controlled by pressure measurement. Pressure was reduced to adsorption conditions of 120 bar. The fixed bed adsorber was tempered at 80° C. When the desired pressure in the fixed bed adsorber was reached, flow control started. The flow of the gas phase was controlled by massflow measurement, which is based on the Coriolis force. The gas flow was about 1.3 $g_{solvent}/(min \cdot g_{adsorbent})$. Adsorption was stopped, when a loading of about 50 wt. % was reached. A solubility of the gas phase in the autoclave of 1 wt. % means a total gas flow of 3000 g or 150 minutes of adsorption time, respectively. The amount of adsorbent was about 30 g. Adsorption was stopped by closing a manually operated valve, which was placed between autoclave and fixed bed adsorber.

EXAMPLE 4

Desorption of the adsorbent obtained in Example 3.

The manually operated valve between autoclave and fixed bed adsorber remained closed and another manually operated valve was opened to provide pure solvent for desorption. The principle of the hydraulic valves to regulate pressure and massflow remains the same as in case of adsorption (Example 3). For desorption, pressure was reduced to 60 bar and the fixed bed adsorber was tempered at 80° C. The solvent was propane. Flow of propane was about 0.17 $g_{solvent}/(min \cdot g_{adsorbent})$. First, the unpressurised fixed bed adsorber was done under pressure. Second, the hydraulic valve to regulate the massflow was opened. After the fixed bed adsorber, propane was released and the desorbed oil was collected in a let-down vessel. Finally, desorption was stopped after a total flow of 360 g propane. Afterwards, pressure of the fixed bed adsorber was released and adsorption can start again.

EXAMPLE 5

Purification of crude synthetic tocopherolacetate by means of supercritical fluid extraction with a mixture of 90% carbon dioxide and 10% propane.

The extraction was done in a column with a packing height of 13.6 m and an inner diameter of 35 mm. The conditions in the column were 40° C. and 140 bar. The SCF was a mixture of 90% carbon dioxide and 10% propane. In the column, a phase equilibrium was reached. Concentration of oil in the gas phase was about 3.7 wt. %. The gas phase was led through a hydraulic valve and a heat exchanger to the separator (9). The hydraulic valve was controlled by pressure measurement. Pressure was reduced to separation conditions of 70 bar. The heat exchanger heated the gas phase at 40° C. After separation of solvent and liquid, gas phase was analyzed and recycled to the extraction column (1). The flow of the SCF was controlled by massflow measurement, which is based on the Coriolis force. The gas flow was about 35 $kg_{solvent}$/h. Before entering the column, gas phase was pressurized and cooled to extraction conditions. Ratio of reflux to extract was about 1. Reflux was fed into the column at 40° C. and 140 bar. Feed flow was 0.750 kg/h. Content of tocopherolacetate in the extract was about 93 wt. % and yield was about 95%.

EXAMPLE 6

Purification of crude synthetic tocopherolacetate by means of supercritical fluid extraction with a mixture of 80% carbon dioxide and 20% propane.

The extraction was done in a column with a packing height of 13.6 m and an inner diameter of 35 mm. The conditions in the column were 40° C. and 120 bar. The SCF was a mixture of 80% carbon dioxide and 20% propane. In the column, a phase equilibrium was reached. Concentration of oil in the gas phase was about 5.8 wt. %. The gas phase was led through a hydraulic valve and a heat exchanger to the separator (9). The hydraulic valve was controlled by pressure measurement. Pressure was reduced to separation conditions of 70 bar. The heat exchanger heated the gas phase at 40° C. After separation of solvent and liquid, gas phase was analyzed and recycled to the extraction column (1). The flow of the SCF was controlled by massflow measurement, which is based on the Coriolis force. The gas flow was about 32 $kg_{solvent}$/h. Before entering the column, gas phase was pressurized and cooled to extraction conditions. Ratio of reflux to extract was about 0.9. Reflux was fed into the column at 40° C. and 120 bar. Feed flow was 1.080 kg/h. Content of tocopherolacetate in the extract was about 92 wt. % and yield was about 96%.

EXAMPLE 7

Preparation of a loaded silica after the purification of crude synthetic tocopherolacetate by means of supercritical fluid extraction with a mixture of 90% carbon dioxide and 10% propane.

The extraction was done in an autoclave. The conditions in the autoclave were 40° C. and 120 bar. These conditions simulate the situation after the separator with a in-loading reduced SCF. The SCF was a mixture of 90% carbon dioxide and 10% propane, which was loaded after the extraction step with synthetic tocopherolacetate of technical grade and impurities which are low volatile compared to vitamin E. In the autoclave, a phase equilibrium was reached. The gas phase was led through a hydraulic valve to the fixed bed adsorber (4). The hydraulic valve was controlled by pressure measurement. Pressure was reduced to adsorption conditions of 110 bar. The fixed bed adsorber was tempered at 50° C. When the desired pressure in the fixed bed adsorber was reached, flow control started. The flow of the gas phase was controlled by massflow measurement, which is based on the Coriolis force. The gas flow was about 1.3 $g_{solvent}$/(min·$g_{adsorbent}$). Adsorption was stopped when a loading of about 50 wt. % was reached. A concentration of oil in the gas phase in the autoclave of 2.3 wt. % means a total gas flow of 1359 $g_{CO2}$ or 65 minutes of adsorption time, respectively. The amount of adsorbent was about 31 g. Adsorption was stopped by closing a manually operated valve, which was placed between autoclave and fixed bed adsorber.

EXAMPLE 8

Purification of technical grade vitamin E up to pharma grade vitamin E by means of supercritical fluid extraction with a carbon dioxide as a supercritical solvent.

The extraction was done in a column with a packing height of 13.6 m and an inner diameter of 35 mm (32). The conditions in the column were 50° C. and 160 bar. The SCF was pure carbon dioxide. In the column, a phase equilibrium was reached. Concentration of oil in the gas phase was about 2.3 wt. %. The gas phase was led through a hydraulic valve (33) and a heat exchanger (34) to the separator (35). The hydraulic valve was controlled by pressure measurement. Pressure was reduced to separation conditions of 70 bar. The heat exchanger heated the gas phase at 50° C. After separation of solvent and liquid, gas phase was and recycled to the extraction column (32). The flow of the SCF was controlled by massflow measurement, which is based on the Coriolis force. The gas flow was about 56 $kg_{solvent}$/h. Before entering the column, the gas phase was pressurized and cooled to extraction conditions. Ratio of reflux to extract was about 30. Reflux was fed into the column at 50° C. and 160 bar. Feed flow was 0.519 kg/h. Content of tocopherolacetate in the raffinate was about 97.4 wt. % and yield was about 99%.

EXAMPLE 9

Purification of technical grade vitamin E up to pharma grade vitamin E by means of supercritical fluid extraction with a carbon dioxide as a supercritical solvent.

The extraction was done in a column with a packing height of 13.6 m and an inner diameter of 35 mm (32). The conditions in the column were 60° C. and 200 bar. The SCF was pure carbon dioxide. In the column, a phase equilibrium was reached. Concentration of oil in the gas phase was about 2.5 wt. %. The gas phase was led through a hydraulic valve (33) and a heat exchanger (34) to the separator (35). The hydraulic valve was controlled by pressure measurement. Pressure was reduced to separation conditions of 70 bar. The heat exchanger heated the gas phase at 60° C. After separation of solvent and liquid, gas phase was and recycled to the extraction column (32). The flow of the SCF was controlled by massflow measurement, which is based on the Coriolis force. The gas flow was about 50 $kg_{solvent}$/h. Before entering the column, the gas phase was pressurized and cooled to extraction conditions. The ratio of reflux to extract was about 16. Reflux was fed into the column at 60° C. and 200 bar. Feed flow was 0.500 kg/h. Content of tocopherolacetate in the raffinate was about 98.6 wt. % and yield was about 91%.

While the invention has been illustrated and described with respect to illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

What is claimed is:

1. A process for preparing an oil, which process comprises the steps of:
   a) extracting, in an extraction device, an oil from an oil crude product by means of supercritical fluid extraction, thereby obtaining a loaded supercritical fluid (SCF);
   b) expanding the loaded SCF of step a) followed by heating to obtain a liquid phase and an in-loading reduced SCF phase;
   c) optionally decreasing the pressure, raising the temperature or decreasing the pressure and raising the temperature of the SCF phase of step b) to conditions of adsorption;
   d) introducing the SCF of step b) or step c) into a fixed bed adsorber to obtain an adsorbent loaded with the purified oil and pure SCF;
   e) feeding the liquid phase of step b) as a reflux to the extraction device of step a);
   f) compressing and tempering the pure SCF of step d) to extraction conditions; and
   g) recycling the pure SCF to the extraction device of step a).

2. A process according to claim 1, wherein the oil is selected from the group consisting of vitamin A, vitamin D, vitamin E, vitamin K, a carotenoid, and a PUFA.

3. A process according to claim 2, wherein the oil is vitamin E.

4. A process according to claim 1, wherein the SCF is selected from the group consisting of carbon dioxide, methane, ethane, propane, n-butane, acetone, and mixtures thereof.

5. A process according to claim 4, wherein the SCF is carbon dioxide.

6. A process according to claim 1, wherein the adsorbent is selected from the group consisting of a zeolite, an activated carbon, a molecular sieve, activated alumina, and silica.

7. A process according to claim 6, wherein the adsorbent is silica.

8. A process according to claim 1, wherein the adsorbent is loaded with the oil in an amount of at least 30 wt %.

9. A process according to claim 8, wherein the adsorbent is loaded with the oil in an amount of at least 50 wt %.

10. A process according to claim 1, wherein step a) is carried out at a pressure of about 80 to about 310 bar.

11. A process according to claim 10, wherein the pressure is about 140 to about 170 bar.

12. A process according to claim 1, wherein step a) is carried out at a temperature of about 35° C. to about 100° C.

13. A process according to claim 12, wherein the temperature is about 60° C.

14. A process according to claim 1, wherein the loaded SCF of step a) is in step b) expanded to a pressure of about 30 to about 300 bar and heated to a temperature in the range of about 40 to about 120° C.

15. A process according to claim 14, wherein the pressure is about 120 to 150 bar.

16. A process according to claim 14, wherein the temperature is about 80° C.

17. A process according to claim 1 wherein the fixed bed adsorber of step d) comprises an adsorbent loaded with the oil after the SCF of step b) or c) is passed through the adsorber.

18. A process for preparing an oil, which process comprises the steps of:
   a) extracting, in an extraction device, an oil from an oil crude product by means of supercritical fluid extraction, thereby obtaining a loaded supercritical fluid (SCF);
   b) expanding the loaded SCF of step a) followed by heating to obtain a liquid phase and an in-loading reduced SCF phase;
   c) optionally decreasing the pressure, raising the temperature or decreasing the pressure and raising the temperature of the SCF phase of step b) to conditions of adsorption;
   d) introducing the SCF of step b) or step c) into a fixed bed adsorber to obtain an adsorbent loaded with the purified oil and pure SCF;
   e) feeding the liquid phase of step b) as a reflux to the extraction device of step a);
   f) compressing and tempering the pure SCF of step d) to extraction conditions;
   g) recycling the pure SCF to the extraction device of step a); and
   h) desorbing the adsorbed oil by passing a desorbing solvent through the fixed bed adsorber.

19. A process according to claim 18, wherein the desorbing solvent is selected from the group consisting of carbon dioxide, methane, ethane, propane, n-butane, acetone, ethanol, ethylacetate, and mixtures thereof.

20. A process according to claim 18, wherein step h) is carried out at about 30 to about 300 bar and about 40 to 150° C.

21. A process according to claim 18 further comprising loading the purified oil as a feed additive onto feed.

22. A process for preparing an oil, which process comprises the steps of:
   A) extracting, in an extraction device, a fraction containing an oil together with high volatile components from a crude synthetic or natural oil mixture by means of supercritical fluid extraction (SFE), thereby obtaining a loaded supercritical fluid (SCF) and a raffinate containing the low volatile components of the crude product;
   B) expanding the loaded SCF of step A) followed by heating to obtain a liquid phase containing the oil and high volatile components and an unloaded gas phase (step B-1) or to obtain an in-loading reduced SCF and a liquid phase (step B-2);
   C) optionally decreasing the pressure, raising the temperature or decreasing the pressure and raising the temperature of the in-loading reduced SCF phase of step B-2) to conditions of adsorption;
   D) optionally introducing the in-loading reduced SCF of step B-2) or of step C) into a fixed bed adsorber to obtain an unloaded gas phase and an adsorbent loaded with oil;
   E) collecting the unloaded gas phase of step B-1) or of step D) in a vessel and controlling the content of the gas components;
   F) when using gas mixtures, optionally feeding pure gas into the vessel of step E) to ensure the same gas composition over the entire process time;
   G) feeding part of the liquid phase of step B-1) or all of the liquid phase of step B-2) at the same temperature and pressure of the column as a reflux to the extraction device of step A);

H) pressurizing the gas phase of step E) or of step F) followed by cooling to separation conditions;

I) recycling the SCF of step H) to the extraction device of step A);

J) optionally feeding the liquid phase of step B-1) to a second extraction device;

K) extracting a fraction of high volatile components from the extract of step B-1) by means of SFE thus obtaining a loaded SCF and the pure oil as raffinate;

L) treating the reflux and the SCF as described in the steps B-1-I); and

M) collecting the oil at the bottom of the column as a raffinate.

23. A process according to claim 22, wherein the oil is vitamin E.

24. A process according to claim 22, wherein the SCF is selected from the group consisting of carbon dioxide, methane, ethane, propane, n-butane, acetone, and mixtures thereof.

25. A process according to claim 22, wherein step A is carried out at a temperature of about 40° C. to about 100° C. and a pressure of about 60 bar to about 310 bar, and wherein in step B-1 the pressure is reduced to separation conditions of about 60 bar to about 150 bar, and the subsequent heating step is carried out at about 40° C. to about 80° C.

26. A process according to claim 25, wherein step A is carried out at a temperature of about 40° C. to about 60° C. and a pressure of about 120 bar to about 160 bar; and wherein in step B-1 the pressure is reduced to separation conditions of about 60 bar to about 70 bar and the subsequent heating step is carried out at about 50° C. to about 60° C.

27. A process according to claim 25, wherein step A is carried out at a temperature of about 40° C. to about 60° C.

28. A process according to claim 25, wherein step A is carried out at a pressure of about 120 bar to about 160 bar.

29. A process according to claim 25, wherein in step B-1 the pressure is reduced to separation conditions of about 60 bar to about 70.

30. A process according to claim 25, wherein the subsequent heating step is carried out at about 50° C. to about 60° C.

31. A process according to claim 18 further comprising purifying the oil from step h) up to 99.9 wt %.

32. An adsorbent loaded with an oil prepared according to the process of claim 17.

33. A process according to claim 22 wherein the fixed bed adsorber of step D) comprises an adsorbent loaded with the oil after the SCF of step B-2) or C) is passed through the adsorber.

34. An adsorbent loaded with an oil prepared according to the process of claim 33.

* * * * *

UNITED STATES PATENT AND TRADEMARK OFFICE
CERTIFICATE OF CORRECTION

PATENT NO.   : 6,358,301 B1
DATED        : March 19, 2002
INVENTOR(S)  : Ute Fleck It is certified that error appears in the above-identified patent and that said Letters Patent is hereby corrected as shown below:

<u>Title page,</u>
Item [74], *Attorney, Agent, or Firm,* please change "Bryant Cave LLP" to
-- Bryan Cave LLP --;

<u>Column 14,</u>
Line 12, after "70" please insert -- bar --.

Signed and Sealed this

Twenty-fourth Day of September, 2002

Attest:

Attesting Officer

JAMES E. ROGAN
*Director of the United States Patent and Trademark Office*